United States Patent

Garg

[11] Patent Number: 6,044,357
[45] Date of Patent: Mar. 28, 2000

[54] MODELING A MULTIFUNCTIONAL FIRM OPERATING IN A COMPETITIVE MARKET WITH MULTIPLE BRANDS

[75] Inventor: Amit Garg, White Plains, N.Y.

[73] Assignee: International Business Machines Corporation, Armonk, N.Y.

[21] Appl. No.: 09/073,175

[22] Filed: May 5, 1998

[51] Int. Cl.[7] .............................................. G06F 153/00
[52] U.S. Cl. .............................................. 705/10; 705/28
[58] Field of Search ................................. 705/10, 8, 28; 29/430

[56] References Cited

U.S. PATENT DOCUMENTS

| | | | |
|---|---|---|---|
| 5,596,493 | 1/1997 | Tone et al. | 705/10 |
| 5,630,070 | 5/1997 | Dietrich et al. | 705/8 |
| 5,634,255 | 6/1997 | Bishop | 29/430 |
| 5,765,143 | 6/1998 | Sheldon et al. | 705/28 |

*Primary Examiner*—Allen R. MacDonald
*Assistant Examiner*—Forest O Thompson, Jr.
*Attorney, Agent, or Firm*—Whitham, Curtis & Whitham; Stephen C. Kaufman

[57] ABSTRACT

A computer-implemented method for merging product marketing control, and product inventory control, based on funds availability and funds allocation from the finance division. The computer-implemented method generates a segment-level consumer choice model for a plurality of competing brands, and aggregates that to a market-level consumer choice model. For each of a plurality of feasible marketing strategies, a brand-level demand is estimated, based on the consumer choice models. Based on a predetermined cost for each of the feasible marketing strategies, and on estimated revenues and estimated costs resulting from the corresponding estimated demand, a maximum profit yielding feasible strategy is determined.

7 Claims, 2 Drawing Sheets

MODELING A MULTIFUNCTIONAL FIRM OPERATING IN A COMPETITIVE MARKET WITH MULTIPLE BRANDS

BACKGROUND OF THE INVENTION

1. Field of the Invention

The present invention generally relates to a computer-based method for business management and, more particularly, to a computer implemented method for modeling intrafirm interactions between divisions within a firm operating in a centralized mode.

2. Description of the Related Art

The terminology used for this description is in general accordance with the accepted terminology used by persons of ordinary skill in the relevant arts. Addition definitions will be given where appropriate. For example, the term "marketing" is defined herein as the process of planning and executing the conception, pricing, promotion and distribution of ideas, goods and services to create exchanges that satisfy individual and organizational objectives, which is in accordance with the well-known treatise Kotler, P., *Marketing Management*, 7$^{th}$ Edition, Prentice-Hall, Englewood Cliffs N.Y., 1991. Operations management is defined herein as the management of the direct resources required to produce the goods and services provided by an organization. Finance is defined as the function that manages cash levels in the firm and enables it to make expenditures on promotions, purchase of raw materials, etc.

Researchers in the area of marketing have developed various models for causal forecasting of demands. A subset of these causal models is employed by marketing managers to assist their devising of business strategies. One such causal model is the model of consumer choice, based largely on household panel data, which has enabled researchers to study choice behavior, brand preferences, and purchase habits. Consumer choice models have a bearing on market share models, which have also been studied extensively. Market share models are viewed as useful for evaluating the competitive effects of price and promotions on market shares of each brand and involve using aggregate data at store, regional, or market level.

Example studies of the dynamic interface between marketing and operations are found in: Welam, U. P., On a Simultaneous Decision Model for Marketing, Production, and Finance, *Management Science*, 23, 9, 1977, 1005–1009; Eliashberg, J., and R. Steinberg, Marketing-Production Decisions in an Industrial Channel of Distribution, *Management Science*, 33, 8, 1987, 981–1000; Porteus, E., and S. Whang, On Manufacturing/Marketing Incentives, *Management Science*, 37, 9, 1991, 1166–1181; Rajan, A., Rakesh, and R. Steinberg, Dynamic Pricing and Ordering Decisions by a Monopolist, *Management Science*, 38, 2, 1992, 240–262; and Sogomonian, A. G., and C. S. Tang, A Modeling Framework for Coordinating Promotion and Production Decisions within a Firm, *Management Science*, 39, 2, 1993, 191–203.

Much of the above-identified prior work, however, has studied the dynamics of the marketing-operations interface using only one product with deterministic demands. For example, the above-cited work by Porteus and Whang has considered a single-time-period model with multiple end-products. The cited Porteus and Whang model focuses on developing appropriate incentives to make the efforts of "selfish" marketing and operations managers result in a global optimal. Neither that model nor the other above-cited models, however, focus on interactions between different brands and the effect of competition.

The model in the above-cited work of Welam, U. P., relates to a limited study of simultaneous decision making in marketing, finance, and operations. Major limitations of the Welam model are that it only focuses on one product and does not consider the impact of competition between brands.

Marketing forecasts of product consumption and predictions of the success of impending or candidate marketing strategies to sell a product are extremely important to operational management, as such forecasts would allow management to plan and evaluate product production schedules which correspond to, and are matched with, marketing forecasts and predictions reflecting those candidate marketing strategies. However, marketing is an extremely dynamic field and, therefore, a good market model for a particular product category must consider a wide range of variables to ensure the best model possible. None of the known studies or research undertaken to date have sufficiently brought together or proposed an integrated system which allows for inter-firm cooperation/decision-making between marketing, operational management, and finance using a complete market model, geared toward product production, which allows for multiple competitors, marketing strategies, anticipated customer consumption, interaction with like product brands, and overall market health.

Previous researchers have identified market models combining some features of what is termed as a micro-level analysis, which is based on direct survey-type consumer choice data, with what is termed as a macro-level analysis, which is based on aggregate data-based market share information.

One example is Russell, G. J., and W. A. Kamakura, Understanding Brand Competition using Micro and Macro Level Scanner Data, *Journal of Marketing Research*, 31, 1994, 289–303, (the Russell, et al., Understanding Brand Competition model). There are, however, shortcomings in this method. One is that it does not consider or model linkage between marketing management, manufacturing/inventory operations, and finance division of the firm. Another shortcoming, which will be understood to one of ordinary skill from the description of the present invention below, is that the Russell, et al., Understanding Brand Competition Model does not allow its explanatory or marketing mix variables to be selected as Multi-nominal Logit (MNL) or Multiplicative Competitive Interaction (MCI) variables. Instead, the Russell et al. model sets all of its explanatory or marketing mix variables as MNL variables.

Another example of a market model which uses micro and macro level scanner data is termed herein as the "Garg market model", and is described in related U.S. patent application Ser. No. 09/032,527, Integrated Marketing and Operations Decision-making Under Multi-brand Competition, filed Feb. 27, 1998. The Garg market model is more comprehensive than those discussed above in that it addresses the issue of integrated decision-making under multi-brand competition when the firm consists of two divisions: marketing and operations, operating in a decentralized mode. Also, the Garg model allows the marketing mix variables to be selected as either Multi-nominal Logit (MNL) or Multiplicative Competitive Interaction (MCI) variables. However, the cited Garg model does not consider a firm comprising: Marketing Management, Operations Management, and Finance Management.

Therefore, there is a need for an integrated system for coordinated decision making between the Marketing, Operations and Finance branches of a firm competing under multi-brand competition.

SUMMARY OF THE INVENTION

It is an object of this invention to provide an integrated system for coordinated decision making between the Marketing, Operations and Finance branches of a firm competing under multi-brand competition.

It is another object of this invention to provide a forecast model to aid in communication between Marketing and Operations.

It is another object of this invention to provide a model which integrates consumer choice and market share.

An embodiment of the computer-implemented method of this invention first initializes a plurality of marketing mix variables, representing a plurality of feasible marketing strategies, and a corresponding plurality of marketing cost values, representing costs associated with each of the marketing mix variables. The method then selects a sub-plurality of marketing mix variables and, based on the integrated marketing model, estimates, for a plurality of time periods covering a planning horizon, a corresponding demand for each of a plurality of brands. A further embodiment performs the estimation of demand by forming an integrated marketing model for estimating, more accurately than does the prior art, the effects on consumer demand resulting from different marketing strategies.

The method then, based on the prior step's estimated demands and on a plurality of sale price values, calculates an estimated total revenue value corresponding to the selected sub-plurality of marketing mix variables, for each of the plurality of time periods. The method also calculates an estimated total inventory maintenance cost for the aggregate of goods, based on the calculated demands, for each of the plurality of time periods. Based on the estimated total revenue, the estimated total marketing cost, and the estimated total inventory maintenance cost, the method then calculates an estimated period profit/loss value for the selected sub-plurality of marketing mix variables, for each of the time periods. Next, the computer method calculates a total estimated profit/loss value, based on a sum of the estimated profit/loss values over all of the time periods.

The method then selects another sub-plurality of marketing mix variables, representing another marketing strategy, and calculates another estimated total profit/loss value for that selected sub-plurality of marketing mix variables. The method repeats the step of selecting another sub-plurality of marketing mix variables until a predetermined portion of the marketing mix variables have been selected, and thereby generates a corresponding plurality of estimated total profit/loss values. Then, based on which of the estimated total profit/loss values is the largest, the method determines an optimal profit yielding marketing strategy, as represented by the sub-plurality of marketing mix variables corresponding to the largest profit/loss value.

A further embodiment of the invention initializes, for each selection of a sub-plurality of marketing mix variables, an allocated cash value, representing an initial cash available from the Finance division for use by the Marketing and Operations divisions in carrying out the marketing strategy corresponding to the selected sub-plurality of marketing mix variables. This embodiment then updates the allocated cash value for each of the plurality of time periods, based on the accumulated sum of the period of the estimated period profit/loss values for all of the previous time periods. The embodiment then sets a viability value for each selected sub-plurality of marketing mix variables, based on the updating of the allocated cash value over the plurality of time periods. The viability value represents the economic feasibility of the corresponding sub-plurality of marketing mix variables.

An example sequence of events, as modeled by the method of the present invention, is as follows: An outstanding order due for a particular time period is received. The Finance division reviews the firm's inventory position for each brand and its cash on-hand. The Finance division allocates a portion of the cash on-hand to the Marketing and the Operations divisions. The Marketing division uses its allocated funds to develop and implement a marketing strategy to maximize its profits, based on the present method for estimating the total revenue and total inventory maintenance cost for the aggregate of brands it sells, as a function of each feasible marketing strategy, together with the direct cost for implementing the strategy. The Operations division uses its allocated funds to determine base stock levels, as a function of the marketing strategy, that minimize inventory holding and purchasing costs over all brands it manufactures. The customer demands are then observed over the period and finally, at the end of the period, the inventory holding costs are assessed. The inventory holding costs are based in part on how much the customer demand, which is driven in part by the selecting marketing strategy, falls short of the base stock level.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

The objective of the present invention is to select a marketing strategy that maximizes a firm's profits over a planning horizon. The present invention assumes that the firm starts with a given amount of cash on hand, which bounds its costs throughout the planning horizon. The optimal marketing strategy therefore must, in addition to maximizing the firm's profits, maintain all expenditures on the marketing strategy within a predetermined budget.

The present invention models a firm as being in a competitive market comprising several firms selling products within a category. A firm in this market sells one or more brands of products within this category. Each customer in this market belongs to one of the several segments based on his/her purchasing behavior. Firms employ different promotional and pricing strategies for the brands they sell. The invention assumes each firm knows the total size of the market for this category and is responsible for its promotion and pricing strategies. A firm's pricing and promotion strategy will affect its relative market share (and profit) but will not affect total category sales.

In addition to inter-firm interactions resulting from competition, the present method models intra-firm interactions. To model the intra-firm interactions, the present method assumes that the firm consists of three divisions, Marketing, Operations, and Finance. The method further assumes that the firm operates in a centralized mode, with the Marketing, Operations, and Finance divisions making coordinated decisions. The present invention recognizes a need for coordinated decision-making, in that the Finance division must allocate working capital, i.e., cash, efficiently to the Marketing and Operations divisions in order to maximize the firm's profits. The Marketing division uses the allocated cash for its marketing campaigns, such as promotions and advertising. Further, both the Finance division and the Marketing division operate as a profit center. The objective of a profit center is to maximize profits given a finite resource of working capital, or cash. The Operations division, on the other hand, is a cost center of the firm. The Operations division uses the cash allocated to it from the Finance division to purchase raw materials, to manufacture the items, and to pay for holding safety stocks of its brands. The objective is to minimize its costs. The marketing strategy must, therefore, be determined jointly by the three divisions of the firm.

Figure 1:
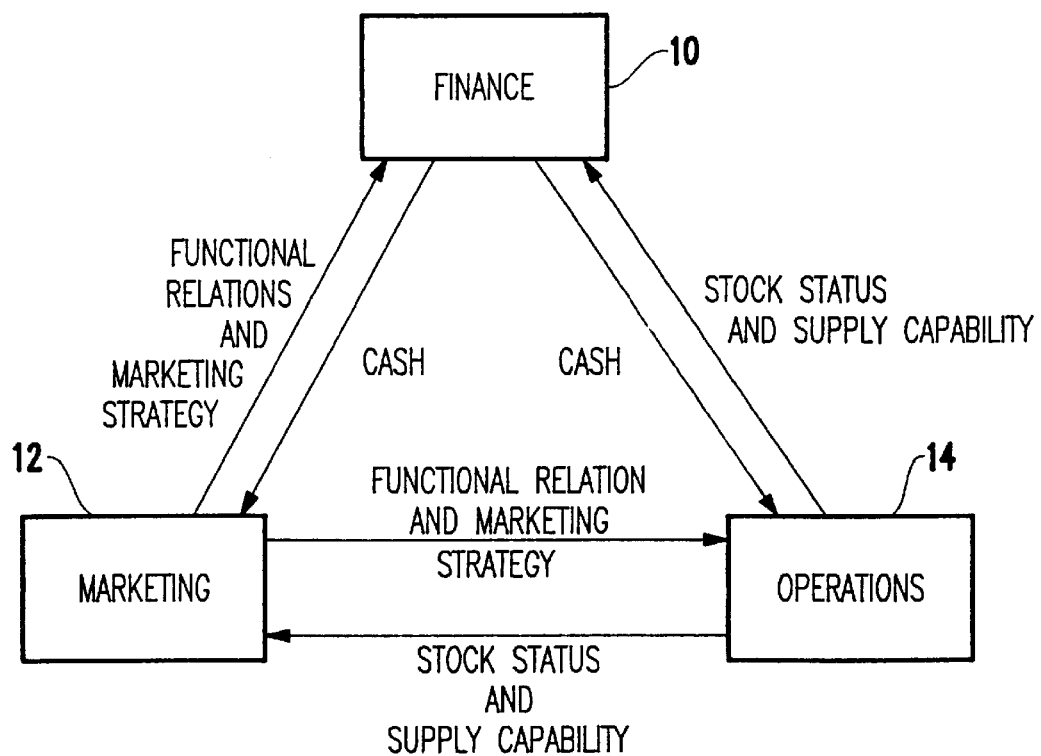
FIG. 1 is a diagram of the information and control flow according to the present invention between the computer model's Finance, Marketing, and Operation divisions of a firm.

Referring to FIG. 1, the interrelation of the Finance, Marketing, and Operations divisions, shown as items 10, 12 and 14, respectively, will described. As shown, the Finance division 10 allocates cash to the Marketing division 12 for advertising and promotion campaigns for each brand sold by the firm, and to the Operations division 14 to purchase inventory and carry safety stock levels of each brand. The Marketing division 12 communicates the functional relationship between the marketing mix variables for each brand and their demands to the Finance and the Operations divisions 10 and 14. This functional relationship is based, according to the method of the present invention, on the integrated consumer choice and market share model, hereafter called the Garg Integrated Consumer Choice and Market Share Model, described by the co-pending application Ser. No. 09/032,527, Integrated Marketing and Operations Decision-making Under Multi-brand Competition, filed Feb. 27, 1998, to Amit Garg, which is hereby incorporated by reference. As described in further detail below, the marketing strategy adopted by the firm determines the levels of marketing mix variables for the brands it sells.

The Operations division 14 uses a causal demand information derived from the Garg Integrated Consumer Choice and Market Share Model to characterize the demand distribution for each brand. As described by the above-identified and incorporated co-pending application Ser. No. 09/032, 527, to Amit Garg, this demand distribution is used to set base stock levels, identified herein as $S_{jt}$, for inventory management by the Operations division. The Operations division 14 then communicates its supply capability and base stock levels to the Marketing and Finance divisions 12 and 10, respectively. The Marketing division 12 then, utilizing the base stock level and supply capability information from the Operations division 14, that information being based on the functional relationships communicated by the Marketing division 12, and the cash from the Finance division 10, determines a marketing strategy.

A first example embodiment of the computer-implemented method of the present will be described.

For consistency, the notation and variable labels used for this description will be defined first, along with the assumptions on which the described method is based.

The index t is the index referring to time period, t=1, . . . , T, and i and j, for i,j=1, . . . , B are the index for brands. The index k is the index for the marketing mix variables, k=1, . . . , K. The variable $X_{kjt}$ denotes the level of marketing mix variable $k^1$ for brand j in period t, and $X_t$ denotes the matrix of marketing mix variables for all brands in period t. The variable $X_{-jt}$ denotes the vector of levels of marketing mix variables for brand j in period t. $X_{-jt}$, for this example embodiment, represents the marketing strategy of brand j in period t, and $X_t$ represents the marketing strategies for all brands in period t. The model assumes that marketing strategies $X_t$ are drawn from X, a finite K×B-dimensional space for feasible values of $X_{kjt}$.

The definition for each of the other variables used for this description is given below.

$Z_{jt}(X_t)$ is the random variable denoting the sales of brand j in period t and is a function of marketing strategies for all brands in that period. $z_{jt}(X)$ is assumed to be quasi-concave in X and $z_{jt}(X)<\infty \forall j,t$ and $X \in X$.

$G_t$ is the on-hand cash at the beginning of period t before any decisions are made.

$C_{kj}(.)$ is the cost of maintaining marketing mix variable k for brand j at level x. $C_{kj}(.)$ is assumed to be non-decreasing.

$S_{jt}$ is the base stock level for brand j in period t.

$I_{jt}(S_{jt})$ is the average on-hand inventory for brand j in period t, and is a function of the base stock level.

$h_j$ is the unit inventory holding cost per period for brand j.

$m_t$ is the total category sales in period t.

γ is the fill-rate requirement for all brands sold by the firm.

$c_j$ is the unit cost of brand j.

$l_{jt}$ is the number of units of brand j ordered in period t.

$X_{1jt}$ denotes the price of brand j in period t, for j=1, . . . , B, and t=1, . . . , T. Also, F denotes the set of brands sold by the firm, $F \subseteq \{1, \ldots, B\}$.

The Operations division 14 uses the causal demand information derived from the integrated consumer choice model and market share model to characterize the demand distribution for each brand. The demand distribution is used to set base stock levels for each brand. Finally, Operations division 14 communicates its supply capability and safety stock levels to the Marketing 12 and Finance 10 divisions.

The firm's optimization problem will be termed "P" and is written, for this example, as $$(P): \max E\left(\sum_{t=1}^{T}\sum_{j\in F}\left[X_{1jt}z_{jt}(X_t) - \sum_{k=2}^{k}C_{kj}(X_{kjt}) - c_j l_{jt} - h_i I_{jt}(S_{jt})\right]\right) \quad (1)$$

where P is subject to $$G_{t=1} = G_2 + \sum_{j\in F}\left[X_{1jt}z_{jt}(X_t) - \sum_{k=2}^{k}C_{kj}(X_{kjt}) - c_j l_{jt} - h_i I_{jt}(S_{jt})\right], \quad (2)$$

$$1 \leq t \leq T$$

$$P(s_{jt} \geq z_{jt}(X_t), j\in F) \geq \gamma, \; 1 \leq t \leq T \quad (3)$$

$$G_1 = g \quad (4)$$

$$l_{jT} = 0, \; j\in F \quad (5)$$

where $G_t \geq 0$ for $1 \leq t \leq T$, $z_{jt}(X_t)$, $l_{jt} \geq 0$ for $j\in F$ and $1 \leq t \leq T$, and $X_t \in X$ for $1 \leq t \leq T$.

The function (1) is also termed as the "objective function." The following can be seen regarding the optimization function (1). First, the objective function is the sum over time of the difference between the revenue in a period and the total expenses incurred by the firm in the period. Second, as can be seen, the objective function does not explicitly consider the cash on-hand. As a result, it will always be in the firm's interest to utilize its cash to the maximum possible extent because holding excess cash in a period does not yield any benefits. In addition, the objective function (1) implicitly assumes items to have zero salvage value at the end of the horizon and that all back-ordered demands in period T are lost. The components of the objective function, equation (1), are as follows:

$X_{1jt} z_{jt}(X_t)$ is the revenue from sales of brand j in period t, $$\sum_{k=2}^{K} C_{kj}(X_{kjt})$$

is the cost of implementing a marketing strategy for brand j in period t, $c_j I_{jt}$ is the cost of purchasing inventory of brand j in period t, and $h_j I_{jt}(S_{jt})$ is the inventory holding cost for brand j in period t.

The above-defined optimization problem P, according to its equation (1), has four sets of constraints, shown as equations (2)–(5). Equation (2) is the cash balance constraint. Equation (3) is the fill-rate requirements for all brands sold by the firm, equation (4) is the initial amount of on-hand cash, and equation (5) is the end condition whereby no orders are placed in the last period of the horizon.

The functional relationships $z_{jt}(X_t)$ and $I_{jt}(S_{jt})$ are defined according to an integrated consumer choice and marketing mix model consistent with the Garg Integrated Consumer and Market Segment Model described by the above-identified and incorporated co-pending Application Ser. No. 09/032,526, to Amit Garg. The integrated consumer choice and marketing mix model is formed, for purposes of this invention, by the example system shown and described at said co-pending Application. These functional relationships result from a linkage between the Marketing and Operations divisions.

The description below will first develop the integrated consumer choice and marketing mix model and will then describe the integrated model's use to characterize the distribution of demands for each brand in a period as a function of marketing mix variables. The characterization of demand distribution $z_{jt}(X_t)$ will be used to derive optimal base stock levels $S_{jt}$.

This example embodiment of the invention assumes that purchases of a brand by each household follow a Poisson distribution. Let $\lambda_{jht}$ be the weekly quantity of brand j purchased by households belonging to segment h in period t. Since purchases of each consumer within the segment follow a Poisson distribution, total weekly purchases of brand j by consumers in segment h in period t, $X_{jht}$, also has a Poisson distribution with mean $$\lambda_{jht} = \lambda_{ht} s_{jht} \quad (6)$$

where $\lambda_{ht}$ is a measure of the overall weekly quantities purchased by consumers in segment h in period t, and $S_{jt}$ is the relative market share of brand j in segment h in period t. Relative market share of a brand within a segment will, for this example, be expressed as:

$$s_{jht} = \frac{A_{jht}}{\sum_{j=1}^{B} A_{jht}}, \quad i = 1, \ldots B; \; h = 1, \ldots, H, \quad (7)$$

where $A_{jht}$ is the attraction of brand j to consumers in segment h in period t.

The attraction of a brand within a segment will be expressed as $$A_{jht} = \exp(\alpha_j + \epsilon_{jht}) \prod_{k=1}^{K} \prod_{j=1}^{B} f_k(X_{kjt}) \beta_{kijt}^{(h)} \quad (8)$$

where:

$\alpha_i$ is the constant attraction of brand i assumed to be independent of the segment;

$\epsilon_{jht}$ is the error term;

$X_{kit}$ is the value of the $k^{th}$ explanatory variable or the marketing mix variable for brand j at time period t (e.g., price for brand j);

$\beta_{kjit}^{(h)}$ is the parameter to be estimated; and $f_k(.)$ is a monotone transformation of the explanatory variable, $X_{kit}$ As readily seen, it is expected that $$\sum_{i=1}^{B} s_{jht} = 1,$$

for all t.

The model defined above is very general. Further, the model allows for asymmetric cross-competitive influences of other brands available in the market. In addition, the monotonic transformation function $f_k(.)$ permits an explanatory variable to be a Multi-nominal Logit (MNL) or a Multiplicative Competitive Interaction (MCI) variable. Therefore, if $f_k(X_{kjt})=X_{kjt}$, $X_{kjt}$ is MCI, while $X_{kjt}$ is MNL if $f_k(X_{kjt})=\exp(X_{kjt})$. Given the segment-level model defined above, its properties will be described.

First, for characterization and analysis of the market and competitive structures within segment h, the direct and cross market-share elasticities are calculated. Let $es_{ijt}^{(h,k)}$ be the market-share elasticity in segment h for brand i due to changes in the marketing mix variable, $X_{kj}$ caused by brand j's actions in period t.

$$es_{ijt}^{(h,k)} = \begin{cases} \beta_{kijt}^{(h)} - \sum_{l=1}^{B} s_{lht} \beta_{kljt}^{(h)} & \text{if } X_{kjt} \text{ is } MCI, \\ \left(\beta_{kijt}^{(h)} - \sum_{l=1}^{B} s_{lht} \beta_{kljt}^{(h)}\right) X_{kjt} & \text{if } X_{kjt} \text{ is } MNL, \end{cases} \quad (9)$$

Elasticity expressions in the equation (9) will be re-written, according to the following example expression, to analyze competitive effects:

$$es_{ijt}^{(h,k)} = \quad (10)$$

$$\begin{cases} (1-s_{iht})\beta_{kijt}^{(h)} - s_{hjt}\beta_{kijt}^{(h)} - \sum_{l \ne i,j}^{B} s_{lht}\beta_{kljt}^{(h)}, & \text{if } X_{kjt} \text{ is } MCI, \\ \left((1-s_{iht})\beta_{kijt}^{(h)} - s_{hjt}\beta_{kijt}^{(h)} - \sum_{l \ne i,j}^{B} s_{lht}\beta_{kljt}^{(h)}\right)X_{kjt}, & \text{if } X_{kjt} \text{ is } MNL, \end{cases}$$

In equation (10), the first term on the right-hand side represents the direct competitive effect of brand j's actions on the market share of brand i. The second term represents the indirect effect of brand i's actions on the market share of brand i, while the third term $q_h$ represents the indirect competitive effect due to all other brands.

In addition, the total market-share elasticities at time period t can be expressed as functions of the segment level market-share elasticities derived above.

$$e_{ijt}^{(k)} = \sum_{h=1}^{H} q_{ht} es_{ijt}^{(h,k)} \quad (11)$$

where $q_{ht}$ is the expected relative volume of segment h in period t. $q_{ht}$, for all t, will be expressed as $$q_{ht} = \frac{\lambda_{ht}}{\sum_{g=1}^{H} \lambda_{gt}} \quad (12)$$

$Y_{jt}$ is the market share of brand j in period t, for all t, i.e., $$y_{jt} = \frac{z_{jt}(X_t)}{\sum_{j=1}^{B} z_{jt}(X_t)}, \quad (13)$$

where $$\sum_{j=1}^{B} z_{jt}(X_t) = m_t \quad \text{for all } t$$

Defining $m_t$ as the total category sales in the market in time period t, obtained from market information sources, and $Y_{it}$ as the market share of each brand in time period t, the following set of properties 1.1 through 1.4, collectively referenced hereinafter as "Property 1", apply to the method and operation of the present invention:

Property 1.1:

Assuming individual household purchases follow a Poisson distribution, the market share of each brand, $Y_{it}$, conditioned on total category sales, $m_t$, has a multinomial distribution with mean $P_{it}$ of:

$$p_{it} = \sum_{h}^{B} q_{ht} s_{iht}, \quad \text{for all } t, \quad (14)$$

where $$\sum_{j=1}^{B} p_{it} = 1,$$

Property 1.2:

The joint distribution of demands for each brand is multinomial with a probability distribution function (pdf), for all t, given by $$P(z_{1t}(X_t) = n_1, \ldots, z_{Bt}(X_t) = n_B \mid m_t) = \frac{m_t!}{n_1! \ldots n_B!} p_{1t}^{n_1} \ldots p_{Bt}^{n_B} \quad (15)$$

where $\sum_{j=1}^{B} n_j = m_t$

Property 1.3:

The covariance of demands for each brand is given by:

$$\text{Cov}(z_{it}(X_t), z_{jt}(X_t) \mid m_t) = \begin{cases} -m_t p_{it} p_{jt}, & \text{if } i \ne j; \\ m p_{it}(1 - p_{it}), & \text{otherwise}, \end{cases} \quad (16)$$

Property 1.4:

The marginal distribution of brand i in period t given the total sales in the category is binomial with parameters $m_t$ and $p_{it}$, i.e., $$P(z_{it}(X_t) = n_i \mid m_t) = \frac{m_t!}{n_i!(m_t - n_i)!} p_{it}^{n_i}(1 - p_{it})^{m_t - n_i}. \quad (17)$$

Proofs of these properties 1.1 through 1.4 making up Property 1 are straightforward to one of ordinary skill, and a presentation here is not necessary for an understanding of this invention and, hence, these proofs are omitted.

Given the characterization of demands defined by Property 1, the optimal base stock levels $S_{jt}$ are computed. The computation is based on the objective of each brand manager being to stock the minimum amount of inventory required to satisfy customer service requirements represented by fill rates. It is assumed, for purposes of this description, that the fill rates for all brands are the same. Further, since demands for brands are correlated, one cannot determine base stock levels for each brand independently. The resulting problem for determining the base stock levels can, however, be formulated according to the following non-linear program, (PT):

$$(PT) : \min \sum_{i=1}^{B} h_{it} I_{it}(S_{it}) \quad (18)$$

with (PT) subject to the following:

$$P(S_{it} \ge z_{it}(X_t) = 1, \ldots B \mid m_t) \ge \gamma \quad (19)$$

where $h_{it}$ is the unit holding cost per period for items of brand i, $I_{it}(S_{it})$ is the average on-hand inventory of brand i over period t, which is a function of base stock level, $S_{it}$, of the brand at time t, and $\gamma$ is the fill-rate requirement for the brands. The joint probability function in constraint (19) can be computed using Property 1. Optimal base stock levels can be computed using a simple search procedure.

The relationship between the average on-hand inventory for a brand and its base stock level will now be derived.

Average inventory on hand at the beginning of the period t after the ordering decision has been made, but before any demands are observed, is $S_{it}$. Average on-hand inventory at the end of a period is $S_{it} - m_t p_{it}$. Therefore, average on-hand inventory in a period for brand i, $I_{it}(S_{it})$ can be written as $I_{it}(S_{it}) = S_{it} - m_t p_{it}/2$ Therefore, the non-linear programming problem, (PT), can be re-written as:

$$(PT'): \min \sum_{i=1}^{B} h_{it}\left(S_{it} - \frac{m_t p_{it}}{2}\right) \quad (20)$$

subject to equation (19).

The procedure for determining the base stock level of brands belonging to the firm is similar to the determination of base stock levels for all brands. The results of determining the base stock levels for all brands will apply once the marginal distribution of brands belonging to the firm, i.e., for $i \in F$, is obtained, where F is the set of brands belonging to the firm. To that end, define $$p'_{it} = 1 - \sum_{i \in F} p_{it}$$

and $$n'_t = m_t - \sum_{i \in F} n_i.$$

For example, if the market is multinomial distribution, the marginal distribution at time period t of brands belonging to the firm is given by:

$$P(Z_{it}(X_t) = n_i, \ i \in F \mid m_t) = \frac{m_t!}{n_i! \prod_{i \in F} n_i} p'^{n'} \prod_{i \in F} p_{it}^{n_i}. \quad (21)$$

One of ordinary skill can now set up the optimization problem similar to problem (PT') to determine base stock levels for items belonging to the firm.

An inventory model under imperfect information is a generalization of the perfect information case and is more realistic because firms usually do not know the exact strategy their competitors will adopt. Uncertainty in firms' actions can be modeled by associating a probability distribution with each marketing mix variable, $X_{kjt}$.

Figure 2:
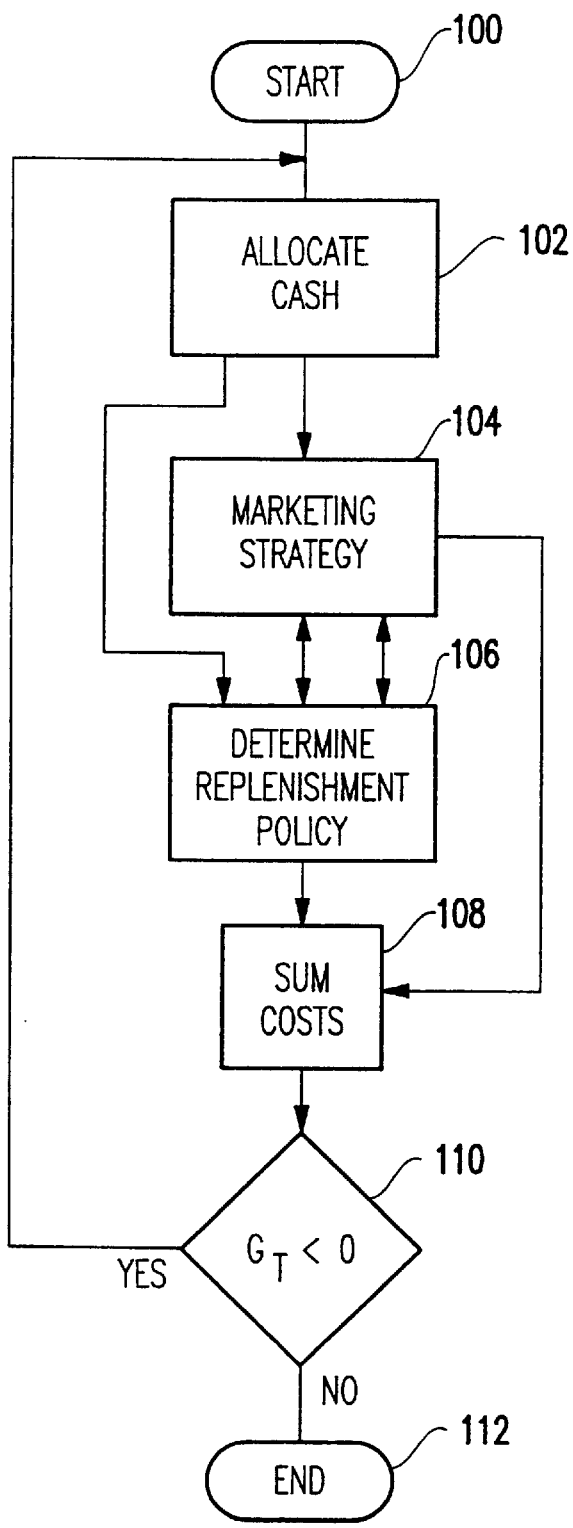
FIG. 2 is a flow chart of the market strategy optimization method of the invention.

Referring now to FIG. 2, a high level operation of the method according to the present invention will be described. FIG. 2 is an example flow diagram for the present method. The method shown FIG. 2 executes equation (1) to find, for a given amount of working cash, which of a finite set marketing strategies yields the highest profit for the firm.

As shown at FIG. 2, the process starts at block 100, which initializes the set F, defined above as the set of brands sold by the firm, $F \subseteq \{1, \ldots, B\}$, the X matrix, defined above as a finite K×B-dimensional space for feasible values of $X_{kjt}$, the variable $X_{kjt}$ defined above as denoting the level of marketing mix variable $k^1$ for brand j in period t, where $X_{1jt}$ denotes price of brand j in period t, for j=1, ..., B, and t=1, ..., T. The start block 100 also initializes $C_{kj}(.)$, defined above as the cost of maintaining marketing mix variable k for brand j at level x; the variable $G_t$, defined above as the on-hand cash at the beginning of period t before any decisions are made; the variables $h_j$, defined above as the unit inventory holding cost per period for brand j; the variables $C_j$, defined above as the unit cost of brand j The FIG. 2 example proceeds to block 102 which represents the Finance division's function of allocating all available cash at the beginning of time period t to the Marketing division's strategy devising functions of block 104 and to the Operation division's stock replenishment functions of block 106. Blocks 104 and 106 then implement the optimization function P defined by equation (1) above, which is:

$$(P): \max E\left(\sum_{t=1}^{T} \sum_{j \in F} \left[X_{1jt} z_{jt}(X_t) - \sum_{k=2}^{k} C_{kj}(X_{kjt}) - c_j l_{jt} - h_{j2} l_{jt}(S_{jt})\right]\right) \quad (1)$$

subject to the conditions defined by equations (2) through (5).

An example distribution of operations, between blocks 104 and 106, for carrying out equation (1), is that block 104, for each time period t, for t=1 to T, calculates the net profit, or loss, resulting from each feasible marketing mix variable $X_{kjt}$, drawn from the matrix X, and sums the profit or loss over the index j of all brands, for j=1 to B. The net profit or loss for each index value of j is represented by the sales revenue, $X_{1jt} z_{jt}(X_t)$, minus the total cost of the K elements of the selected marketing mix variable, which is the sum for k=1 to K of $C_{kj}(X_{kjt})$, and minus the estimated ordering cost, $c_j l_{jt}$, and the inventory cost, $h_j I_{jt}(S_{jt})$. For this example, the estimated ordering cost, $c_j l_{jt}$, and the inventory cost, $h_j I_{jt}(S_{jt})$ are calculated by the Operations division, at block 106, using the example operations and modules shown by FIG. 3 of the above-identified and incorporated co-pending Application Ser. No. 09/032,527, to Amit Garg, and described in further detail below. As will be seen, the Marketing division and the Operations division co-operatively carry out the optimization function P.

More particularly, referring to FIG. 2 and to equations (1) through (5), the Finance division at time t=1 will allocate a total amount of cash g to the Marketing division and the Operations division. In other words $G_1 = g$. The Marketing division then, at block 104, for t=1 to T, increments through X matrix of marketing mix variables, for k=1 to K, and for j=1 to B, and, for each K-dimensioned marketing mix variable for each $j_{th}$ brand of the B brands, calculates the expected demand $z_{jt}(X_t)$ of that brand as a function of the marketing mix variable, or marketing strategy. The expected demand, $z_{jt}(X_t)$, calculated at block 104, is calculated using the Garg Integrated Consumer Choice and Market Share Model of the above-identified and incorporated co-pending application Ser. No. 09/032,527, in accordance with Properties 1.1 through 1.4 defined hereinabove.

As can be seen, the estimated demand, $z_{jt}(X_t)$, of the $j_{th}$ brand is based on the marketing strategy for all of the B brands, not just the $j_{th}$ brand.

Based on the expected demand $z_{jt}(X_t)$ and on the initialized $X_{1jt}$ value, which is the sales price for that ith brand over time period t, block 104 calculates the cash income from sales, $X_{1jt} z_{jt}(X_t)$, for the particular period t, which is a term of equation (1). The Marketing division at block 104 also calculates the total cost of the K-dimensioned marketing mix variable, another cost term of equation (1), by summing the cost $C_{kj}$, for k=1 to K. The cost $C_{kj}$ is initialized at block 100. There is no time index shown for $C_{kj}$ because, for purposes of this description, the cost of a marketing strategy, such as sales price, coupons and rebates, is considered stationary over time. However, as can be seen from equation (1), time varying costs can be accounted for by simply adding a time dimension t to $C_{kj}$.

Block 104 also passes the calculated demand $z_{jt}(X_t)$ to the Operations division of block 106. Based on that demand, block 106 calculates the base stock level $S_{jt}$, which the Operations division 14 uses for inventory control operations, including generation of orders, using, for example, the operations and modules shown by FIG. 3 of the above-identified co-pending Application Ser. No. 09/032,527, filed Feb. 27, 1998, to Amit Garg. The Operations division then calculates an estimated average on-hand inventory, $I_{jt}(S_{jt})$, as a function of the base stock level $S_{jt}$. Then, using the $h_j$ unit inventory cost per time period t for the $j_{th}$ brand, the Operations division calculates the estimated inventory cost for the $j_{th}$ brand, which is $h_j I_{jt}(S_{jt})$ appearing in equation (1), that results from the estimated demand $z_{jt}(X_t)$ which, in turn, results from the Marketing division's selected marketing strategy $X_{jt}$. The operation also uses the estimated demand $z_{jt}(X_t)$ and the base stock level $S_{jt}$ to calculate the estimated cost for placing orders for brand j over time period t, which is the $c_j l_{jt}$ cost term of equation (1) defined above.

Blocks 104 and 106, for each time period t, sum all terms with the brackets, [ ], of equation (1) over j, for j=1 to B, for the selected marketing strategy drawn from the X matrix, to generate the net profit or loss for each time period t resulting from that selected marketing strategy. FIG. 2 represents that summing as block 108, although it can be incorporated into either of blocks 104 and 106. For example, the ordering cost, $c_j l_{jt}$, and the inventory cost $h_j I_{jt}(S_{jt})$, calculated by the Operation division at block 106 can be passed back to the Marketing division block 104 for summing the cost and profit terms with the [ ] brackets of equation (1), or the Marketing block 104 can pass the marketing mix variable cost $C_{kj}(X_{kjt})$ and cash income value $X_{1jt} z_{jt}(X_t)$ values to the Operations division block 106 to perform the summing.

In block 110 the optimum marketing strategy is determined as follows: The net profit or loss over each time period t, for t=1 to T, is summed to calculate the total net profit or loss over the T-period planning horizon, to generate the expected total within the brackets, { }, of equation (1). Block 110, in addition to calculating the total net profit or loss, also keeps a running account of the cash on hand after each time period, $G_{t+1}$, according to equation (2) above. If $G_{t+1}$ is less than zero, the marketing strategy selected by the Marketing division at block 104 from the X matrix is labeled as not viable or infeasible. The loop of blocks 102–110 repeats until all values of the X matrix are exhausted. Then, the process ends at block 112, which identifies, according to equation (1), the feasible marketing strategy from the X matrix that provides the largest expected profit over the T-period planning horizon.

An example system for forming the above-described integrated market share and marketing mix model for carrying out block 104 is shown and described by the above-identified and incorporated co-pending application Ser. No. 09/032,527, to Amit Garg.

An example system and method sub-steps for the inventory-related operations and calculation of corresponding cost for performing block 106 of FIG. 2 are also shown and described by the above-identified and incorporated co-pending application Ser. No. 09/032,527, to Amit Garg.

While the invention has been described in terms of its preferred embodiments, those skilled in the art will recognize that the invention can be practiced with modification within the spirit and scope of the appended claims.

Having thus described our invention, what I claim as new and desire to secure by Letters Patent is as follows:

1. A computer-implemented method for merged marketing management and inventory management, said method comprising the steps of:
   (a) initializing a plurality of marketing mix variables, each of said variables representing marketing strategies for each of a plurality of brands of goods;
   (b) initializing a plurality of cost factors corresponding to said plurality of marketing mix variables;
   (c) initializing a plurality of inventory maintenance cost values and a plurality of sale price values, each of said pluralities corresponding to said plurality of brands;
   (d) selecting a sub-plurality of marketing mix variables from said plurality of marketing mix variables;
   (e) for each of a plurality of time periods:
      (1) calculating an expected total cost of said select sub-plurality of marketing mix variables based on said plurality of cost factors,
      (2) calculating an expected demand of each of a sub-plurality of said plurality brands based on said selected sub-plurality of marketing mix variables, and
      (3) generating an expected total profit/loss value corresponding to said selected sub-plurality of market mix variables, based on said calculated expected demands, said plurality of sale price values, and said plurality of inventory maintenance cost values;
   (f) selecting another plurality of marketing mix variables from a matrix of marketing mix variables;
   (g) generating a plurality of said expected total profit/loss values by repeating steps (d) through (h) until a predetermined portion of said plurality of marketing mix variables is selected; and
   (h) identifying which selected sub-plurality of marketing mix variables generates the largest of said expected total profit/loss values.

2. A computer-implemented method for merged marketing management and inventory management according to claim 1, further comprising steps of:
   initializing an available cash value;
   for each of said time periods, updating said available cash value based on said expected total profit/loss value corresponding to said selected sub-plurality of market mix variables calculated at step (3); and
   determining, for each of said sub-plurality of marketing mix variables selected, a viability value for said selected sub-plurality based on said available cash value updated for each of said time periods.

3. A computer-implemented method for merged marketing management and inventory management according to claim 1, further comprising the step of generating stock orders based on said calculated expected demands.

4. A computer-implemented method for merged marketing management and inventory management, said method comprising steps of:
   (a) initializing a plurality of marketing mix variables, each of said variables representing marketing strategies for each of a plurality of brands of goods;
   (b) initializing a plurality of marketing cost factors corresponding to said plurality of marketing mix variables;
   (c) initializing a plurality of inventory cost values, a plurality of order costs, and a plurality of sale price values, each of said pluralities corresponding to said plurality of brands;
   (d) selecting a sub-plurality of marketing mix variables from said plurality of marketing mix variables, said selected sub-plurality corresponding to a sub-plurality of said plurality of brands;
   (e) for each of a plurality of time periods:
      (1) calculating a total expected cost of said selected sub-plurality of marketing mix variables based on said plurality of marketing cost factors,
      (2) calculating an expected demand of each of said sub-plurality of brands based on said selected sub-plurality of marketing mix variables,
      (3) calculating an expected total cash revenue value based on said calculated expected demands and said plurality of sale price values, (4) calculating a base stock level for each of said sub-plurality of brands based on said calculated expected demands, said plurality of said inventory cost values, and said plurality of said order costs, (5) calculating an expected total inventory cost value based on said calculated base stock levels and said plurality of inventory cost values, (6) calculating an expected total order cost value based on said calculated base stock levels and said plurality of said order costs, and (7) generating an expected total profit/loss value for said selected sub-plurality of marketing mix variables based on said expected total cash revenue, said expected total cost of said marketing mix variables, said expected total inventory cost value, and said expected total order cost value;

(f) selecting another sub-plurality of marketing mix variables from said plurality of marketing mix variables;

(g) generating a plurality of said expected total profit/loss values by repeating steps (d) through (h) until a predetermined portion of said plurality of marketing mix variables is selected; and (h) identifying which sub-plurality of selected marketing variables generates the largest of said total profit/loss values.

5. A computer-implemented method for merged marketing management and inventory management according to claim 4, further comprising the step of generating stock orders based on said calculated expected demands.

6. A computer-implemented method for merged marketing management and inventory management according to claim 4, further comprising steps of:

initializing an available cash value;

for each of said time periods, updating said available cash value based on said expected total profit/loss value corresponding to said selected sub-plurality of market mix variables calculated at step (7); and determining, for each of said sub-plurality of marketing mix variables selected, a viability value for said selected sub-plurality based on said available cash value updated for each of said time periods.

7. A computer-implemented method according to claim 4, wherein steps (d) and (e) are carried out in accordance with the following:

$$(P): \max E\left( \sum_{t=1}^{T} \sum_{j \in F} \left[ X_{1jt} z_{jt}(X_t) - \sum_{k=2}^{k} C_{kj}(X_{kjt}) - c_j I_{jt} - h_i I_{jt}(S_{jt}) \right] \right)$$

where j is the index of the brands at step (a), and F is said sub-plurality of brands, t is the index of the plurality of time periods at step (b), and T is said number of time periods, $X_t$ is said selected sub-plurality of marketing mix variables, $X_{1jt}$, for $j \in F$, is said plurality of sale price values, $$\sum_{j \in F} \sum_{k=2}^{K} C_{kj}(X_{kjt})$$

is the expected total cost of said selected sub-plurality of marketing mix variables calculated at step (b1), $z_{jt}(X_t)$, for $j \in F$, is the expected demand of each of said sub-plurality of brands, at the $t^{th}$ of said T time periods, calculated at step (b2), $$\sum_{j \in F} X_{jlt} z_{jt}(X_t)$$

is the expected total cash revenue value, at the $t^{th}$ of said T time periods, calculated at step (b3), $S_{jt}$, for $j \in F$, is the plurality of base stock levels, at the $t^{th}$ of said T time periods, calculated at step (b4), $$\sum_{j \in F} h_j I_{jt}$$

is the expected total inventory cost value, at the $t^{th}$ of said T time periods, calculated at step (b5), and $$\sum_{j \in F} c_j I_{jt}$$

is the expected total order cost value, at the $t^{th}$ of said T time periods, calculated at step (b6), and P is the sub-plurality of selected marketing variables generates the largest of said total profit/loss values.

* * * * *